United States Patent
Benjamin et al.

(10) Patent No.: US 10,549,657 B2
(45) Date of Patent: Feb. 4, 2020

(54) ADJUSTMENT DEVICE

(71) Applicant: GNS KV GmbH, Bielefeld (DE)

(72) Inventors: Milto Benjamin, Guetersloh (DE); Danijel Jagarinec, Bad Salzuflen (DE)

(73) Assignee: GNS KV GmbH, Bielefeld (DE)

( * ) Notice: Subject to any disclaimer, the term of this patent is extended or adjusted under 35 U.S.C. 154(b) by 181 days.

(21) Appl. No.: 15/577,881

(22) PCT Filed: Jun. 28, 2016

(86) PCT No.: PCT/EP2016/064926
§ 371 (c)(1),
(2) Date: Nov. 29, 2017

(87) PCT Pub. No.: WO2017/005530
PCT Pub. Date: Jan. 12, 2017

(65) Prior Publication Data
US 2018/0162238 A1 Jun. 14, 2018

(30) Foreign Application Priority Data

Jul. 6, 2015 (DE) .................. 10 2015 110 889

(51) Int. Cl.
*B60N 2/16* (2006.01)
*B60N 2/90* (2018.01)

(52) U.S. Cl.
CPC ............. *B60N 2/167* (2013.01); *B60N 2/168* (2013.01); *B60N 2/938* (2018.02)

(58) Field of Classification Search
CPC combination set(s) only.
See application file for complete search history.

(56) References Cited

U.S. PATENT DOCUMENTS 6,212,965 B1 * 4/2001 Hochmuth ........... B60N 2/2257
192/15
6,230,867 B1 5/2001 Schwarzbich
(Continued)

FOREIGN PATENT DOCUMENTS

DE 103 38 306 A1 3/2005
DE 10 2014 103 989 A1 9/2015
(Continued)

OTHER PUBLICATIONS

International Search Report of PCT/EP2016/064926, dated Oct. 4, 2016.

*Primary Examiner* — Sarah B McPartlin
(74) *Attorney, Agent, or Firm* — Collard & Roe, P.C.

(57) ABSTRACT

An adjustment device, in particular for adjusting motor vehicle seats, has: a) a rotatably mounted drive element; b) a rotatably mounted output element; c) a first sprag freewheel, by means of which the output element can be blocked steplessly in different positions in both adjustment directions, and which can be released via a release element; d) a second sprag freewheel, which is coupled to the first sprag freewheel via the release element and by means of which the output element can be blocked steplessly in different positions in both adjustment directions; e) an actuating element for releasing the second sprag freewheel; and f) an additional locking means for securing the first sprag freewheel against rotation with at least one rotatably mounted locking lever.

11 Claims, 5 Drawing Sheets

(56) References Cited

U.S. PATENT DOCUMENTS

| | | | |
|---|---|---|---|
| 6,296,311 B1 * | 10/2001 | Bonk ................... | B60N 2/2227 297/367 R |
| 6,568,759 B1 * | 5/2003 | Hochmuth ........... | B60N 2/2227 297/367 R |
| 9,637,029 B2 | 5/2017 | Benjamin | |
| 2017/0240069 A1 | 8/2017 | Asai et al. | |

FOREIGN PATENT DOCUMENTS

| | | |
|---|---|---|
| EP | 0 979 179 B1 | 9/2002 |
| KR | 101173469 B1 | 8/2012 |
| WO | 2016/059875 A1 | 4/2016 |

* cited by examiner

ADJUSTMENT DEVICE

CROSS REFERENCE TO RELATED APPLICATIONS

This application is the National Stage of PCT/EP2016/064926 filed on Jun. 28, 2016, which claims priority under 35 U.S.C. § 119 of German Application No. 10 2015 110 889.5 filed on Jul. 6, 2015, the disclosures of which are incorporated by reference. The international application under PCT article 21(2) was not published in English.

BACKGROUND OF THE INVENTION

The present invention relates to an adjusting device, in particular for adjusting motor vehicle seats, comprising a rotatably mounted drive element, a rotatably mounted output element, a first sprag freewheel, by means of which the output element can be blocked in a stepless manner in different positions in both directions of adjustment, and which can be released via a release element, a second sprag freewheel, which is coupled to the first sprag freewheel via the release element and by means of which the output element can be adjusted in a stepless manner into different positions in both directions of adjustment, an actuating element for releasing the second sprag freewheel and an additional locking means for securing the first sprag freewheel against a rotation with at least one rotatably mounted locking lever.

EP 0 979 179 discloses a seat adjuster in which an adjustable part can be blocked in a stepless manner in different positions in both directions of adjustment on a fixed part. By means of a release element the blocking can be released in order to move the adjustable part in both directions in a stepless manner. In order to prevent an adjustment of the sprags during vibrations, an additional locking means is provided with locking levers, which engage in teeth of a gearwheel. However, the illustrated additional locking means must be designed for self-locking in such a way that the distance between the rotational axis of the locking levers and the teeth of the gearwheel is relatively large so that a large installation space is required for the adjustment device. In order to pass the vibratory tests carried out by the manufacturer, however, an adjustment movement must be reliably avoided by means of the additional locking means.

SUMMARY OF THE INVENTION

It is therefore the object of the present invention to provide an adjustment device with an additional locking means which has a compact design and, in addition, reliably avoids an adjustment of an output element in a locked position.

This object is achieved with an adjustment device in particular for adjusting motor vehicle seats, comprising a rotatably mounted drive element, a rotatably mounted output element. a first sprag freewheel, by means of which the output element can be blocked in a stepless manner in different positions in both directions of adjustment and can be released via a release element, a second sprag freewheel, which is coupled to the first sprag freewheel via the release element, and by means of which the output element can be adjusted in a stepless manner into different positions in both directions of adjustment, an actuating element for releasing the second sprag freewheel, and an additional locking means for securing the first sprag freewheel against a rotation with at least one locking lever which is rotatably mounted about a rotational axis. The rotatable locking lever of the additional locking means has an actuating section for unlocking, which is arranged offset relative to a ratchet pawl of the locking lever in the circumferential direction of a locking element.

The adjustment device according to the invention comprises an additional locking means for securing the first sprag freewheel against twisting, wherein the additional locking means has at least one rotatable locking lever, which comprises an actuating section for unlocking, and the rotatable locking lever has an actuating section for unlocking, which is arranged offset in the circumferential direction of a locking element relative to a ratchet pawl of the locking lever. Due to the circumferentially displaced arrangement of the ratchet pawl and actuating section, it is possible for the additional locking means to have a small extension in the radial direction of the axis of the adjustment device and therefore a compact design. In addition, as a result of the spacing of the ratchet pawl and the actuating section in the circumferential direction, it is possible to obtain a transmission ratio of the movements in such a way that a small movement of the actuating element leads to a larger movement of the ratchet pawl and thus small movements are sufficient to unlock the additional locking means.

Preferably, the offset of the actuating section to the ratchet pawl extends in the circumferential direction over an angle of at least 10°, preferably between 20° and 50°. The offset is thereby defined by the distance on the circumference of the locking element between the actuating section and the ratchet pawl, and the angle is determined on the one hand from a rotational axis of the locking element to the actuating section on the one hand and to the ratchet pawl on the other hand.

In a further embodiment, the actuating section is provided between a ratchet pawl of the locking lever and a rotational axis of the locking lever. The locking lever can be linear or angled in this case, and, as viewed from the actuating section, the rotational axis of the locking lever and the ratchet pawl are arranged on different sides. It is alternatively also possible to arrange the actuating section and the locking lever with the ratchet pawl on opposite sides of the rotational axis so that a two-armed lever is provided.

According to a preferred embodiment of the invention, the distance of the actuating section from the rotational axis is less than half as large as the distance between the rotational axis and the ratchet pawl. As a result, during a movement of the actuating section, the ratchet pawl is moved by a multiple of the distance, so that a short movement of the drive element is already sufficient to effect unlocking.

Preferably, the additional locking means is unlocked with the ratchet pawl during a rotational movement of the drive element of less than 4°, in particular less than 3°. It is also possible to effect unlocking with a minimum rotational movement of approximately 2°. This ensures that the ratchet pawl can be unlocked with a slight movement of the actuating section, so that the blocking action of the locking lever can be improved in order to avoid unintended turning movement of the output element even if vibrations and a considerable torque act on the adjustment device.

In an advantageous embodiment, the locking lever is designed to be self-locking with the ratchet pawl. If a torque is applied to the additional locking means via the output element, the ratchet pawl cannot be inadvertently unlocked by the self-locking, so that a secure holding of the adjustment device is ensured.

Preferably, the actuating section of the locking lever is movable by a control disk. A locking recess for the actuating section, into which the actuating section engages in the starting position, can be provided on the control disk, wherein the control disk is coupled to the actuating element, so that both are rotated together.

The additional locking means preferably has two locking levers, which are mounted around a different rotational axis. Both locking levers can then be actuated via the same control disk, which, for example, has two spaced-apart locking recesses, each for one actuating section.

For a particularly stable fixing of the additional locking means, the ratchet pawl can be brought into engagement with teeth of a locking element. In this case, the ratchet pawl can have a contact surface which is oriented in an inclined manner to a radial direction of the rotational axis of the locking disk, in particular by an angle between 2° to 15°, for example 4° to 10°. Due to the alignment of the contact surface of the ratchet pawl, it is effect that, when the locking disk is loaded by a torque, the ratchet pawl is moved radially inward, so that unlocking by a movement in the radial direction towards the outside is reliably avoided. The teeth of the locking disk can be essentially rectangular, wherein the tooth flanks can be inclined slightly inward to the radial, for example at an angle of 0° to 10°, in particular 0° to 5°.

BRIEF DESCRIPTION OF THE DRAWINGS

The invention is explained in more detail below with respect to an exemplary embodiment with reference to the attached drawings, wherein.

DETAILED DESCRIPTION OF THE INVENTION

Figure 1:
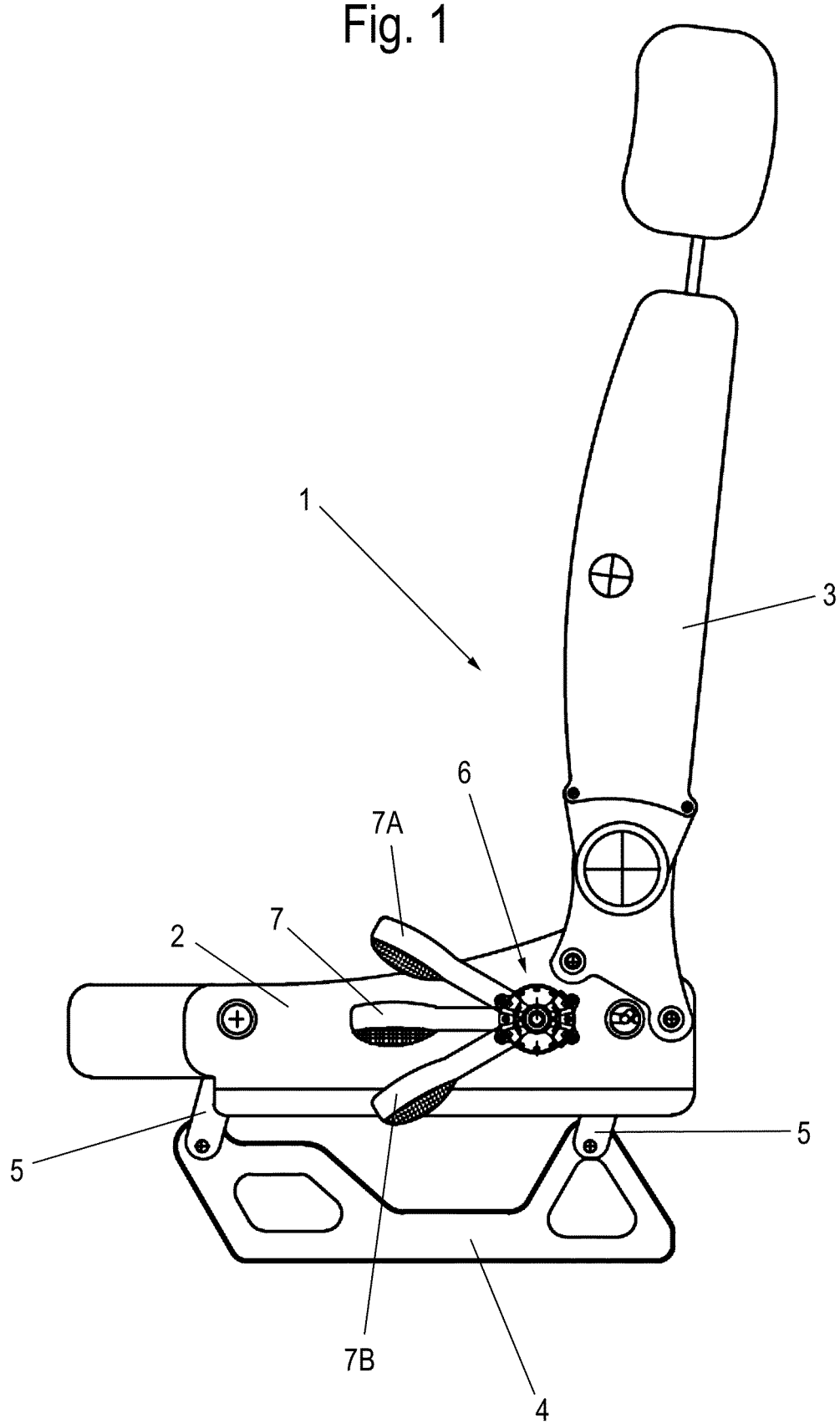
FIG. 1 shows a representation of a seat with an adjustment device according to the invention.
Figure 2:
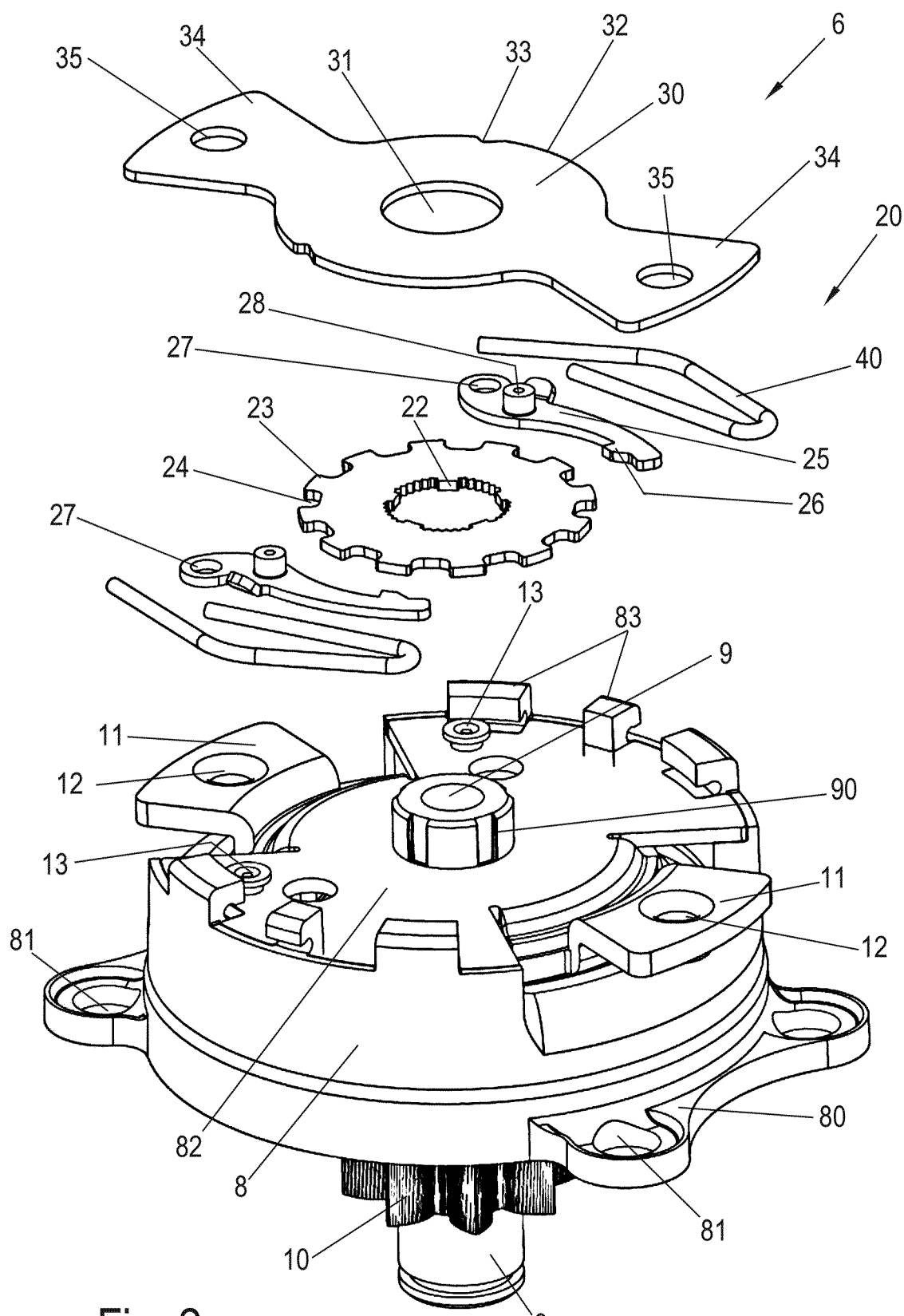
FIG. 2 shows an exploded perspective view of the adjustment device according to the invention.

FIG. 1 shows a seat 1, in particular a seat for motor vehicles, having a seat body 2 and a backrest 3. The seat body 2 with the backrest 3 is supported on a frame 4 and is held by two parallel levers 5. In order to adjust the position of the seat body 2 in height relative to the frame 4, an adjustment device 6 is provided, which can be actuated by means of a drive lever 7. When the drive lever 7 is moved upwards into a position 7A, a pivoting of the levers 5 in the clockwise direction can be initiated via the adjustment device 6, as a result of which the seat body 2 descends. When the drive lever 7 is pivoted downwards into the position 7B, the lever 5 is rotated counterclockwise via the adjustment device 6, so that the seat body 2 rises.

The adjustment device 6 comprises a first and second sprag freewheel, which are arranged between a drive element and an output element. Such sprag freewheels with a corresponding coupling via a release element are disclosed in DE 10 2014 103 989, in particular in FIGS. 2-7, and reference is made to this document. The adjustment device 6 can be configured in this respect as described in this document.

The adjustment device 6 comprises a housing 8 (FIG. 2) which is of cup-shaped design and has lateral webs 80 with openings 81 so that the housing 8 can be fixed to the seat body 2. The housing 8 is covered on the upper side by a cover 82, which engages between the upwardly protruding retaining projections 83 and is connected in a rotationally fixed manner to the housing 8. Within the housing 8, sprag freewheels and a release element are arranged, as is disclosed in DE 10 2014 103 989.

In order to actuate the adjustment device 6, the lever 7 can act on a drive element 11, which is rotatably mounted and has openings 12 for fixing the lever 7. By rotating the drive element 11, the first and second sprag freewheel can be released so that the rotary movement can be transmitted to a shaft 9 on an output element 10 designed as a pinion. By rotating the drive element 11, a shaft 9 is also rotated which has a contour 90 with ribs on the circumference in order to fix a locking element in the form of a locking disk 21 on the shaft 9 in a rotationally fixed manner.

For this purpose, the locking disk 21 has a central opening with inwardly projecting projections 22, which engage with the contour 90. Teeth 23 are formed on the outer circumference of the locking disk 21 and gaps 24 are provided between them.

The locking disk 21 is a component of an additional locking means 20 which prevents the output element 10 from turning, although there is no actuation by the lever 7. However, this can occur in particular if the blockage of the sprag freewheels does not function completely and creeping occurs due to vibrations or bumpy travel paths. In order to avoid such a rotary movement, the additional locking means 20 ensures fixing.

The additional locking means 20 also comprises two locking levers 25, which have an opening 27 at one end for rotatable mounting about an axis 13 provided on the cover 82. Each of the two locking levers 25 has an actuating section 28, by means of which the locking lever 25 can be rotated about the axis 13. In this case, the axis 13 is provided on one side of the actuating section 28, and a ratchet pawl 26 is provided on the opposite side, which can come into engagement with the locking disk 21. Each locking lever 25 is thereby pretensioned into the locked position by a spring 40.

The additional locking means 20 further comprises a control disk 30 which has an opening 31 which is arranged around the shaft 9 without being connected to the shaft 9 in a rotationally fixed manner. The control disk 30 has, on opposite sides, extension arms 34 with an opening 35, which can be positioned on the rotatable drive element 11 in order to connect the control disk 30 to the drive element 11 in a rotationally fixed manner. On an outer circumference 32 of the control disk 30, two locking recesses 33 are provided which are in engagement with the actuating section 28 of the locking lever 25.

Figure 3:
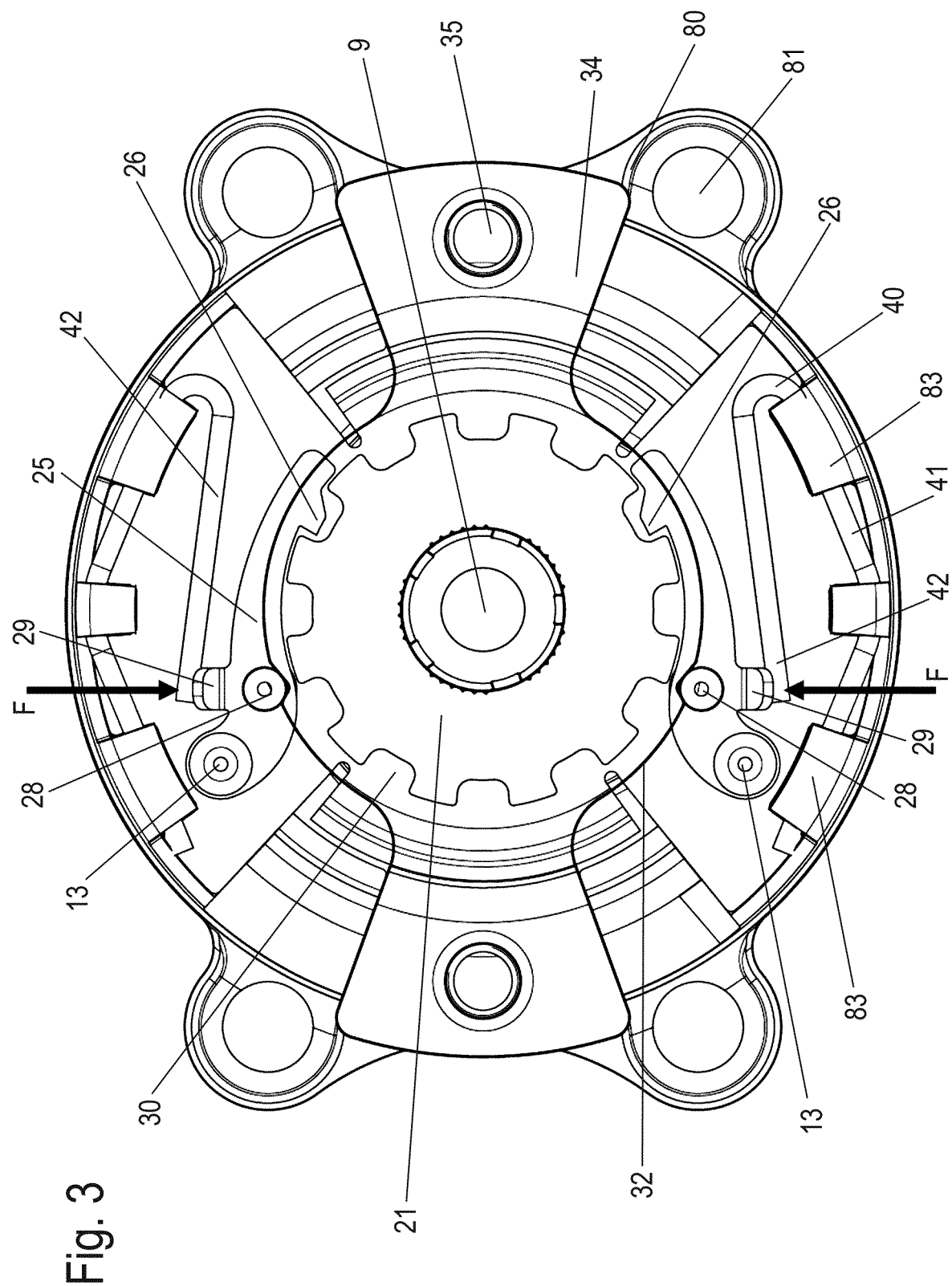
FIG. 3 shows a view of the adjustment device in FIG. 2 in a locked position.

FIG. 3 shows a locking position of the additional locking means 20 of the adjustment device 6. The ratchet pawls 26 are arranged within the gaps 24 between the teeth 23 of the locking disk 21. If the locking disk 21 is subjected to a torque of the axis 9 in a clockwise direction, the upper ratchet pawl 26 on the locking lever 25 can prevent a rotational movement, wherein the locking lever 25 is formed in a self-locking manner. If the torque of the shaft 9 acts in the opposite direction, the lower ratchet pawl 26 on the locking lever 25 provides securing against a rotational movement. Both locking levers 25 are pretensioned in the locked position, wherein a spring 40 of a bent wire is provided for this purpose. The spring 40 comprises a first limb 41, which is fixed to the retaining projections 83 of the housing 8. Integrally with the limb 41, a spring limb 42 is formed which acts on a projection 29 on the locking lever 25 in order to pretension the latter towards the locking disk 21.

Figure 4:
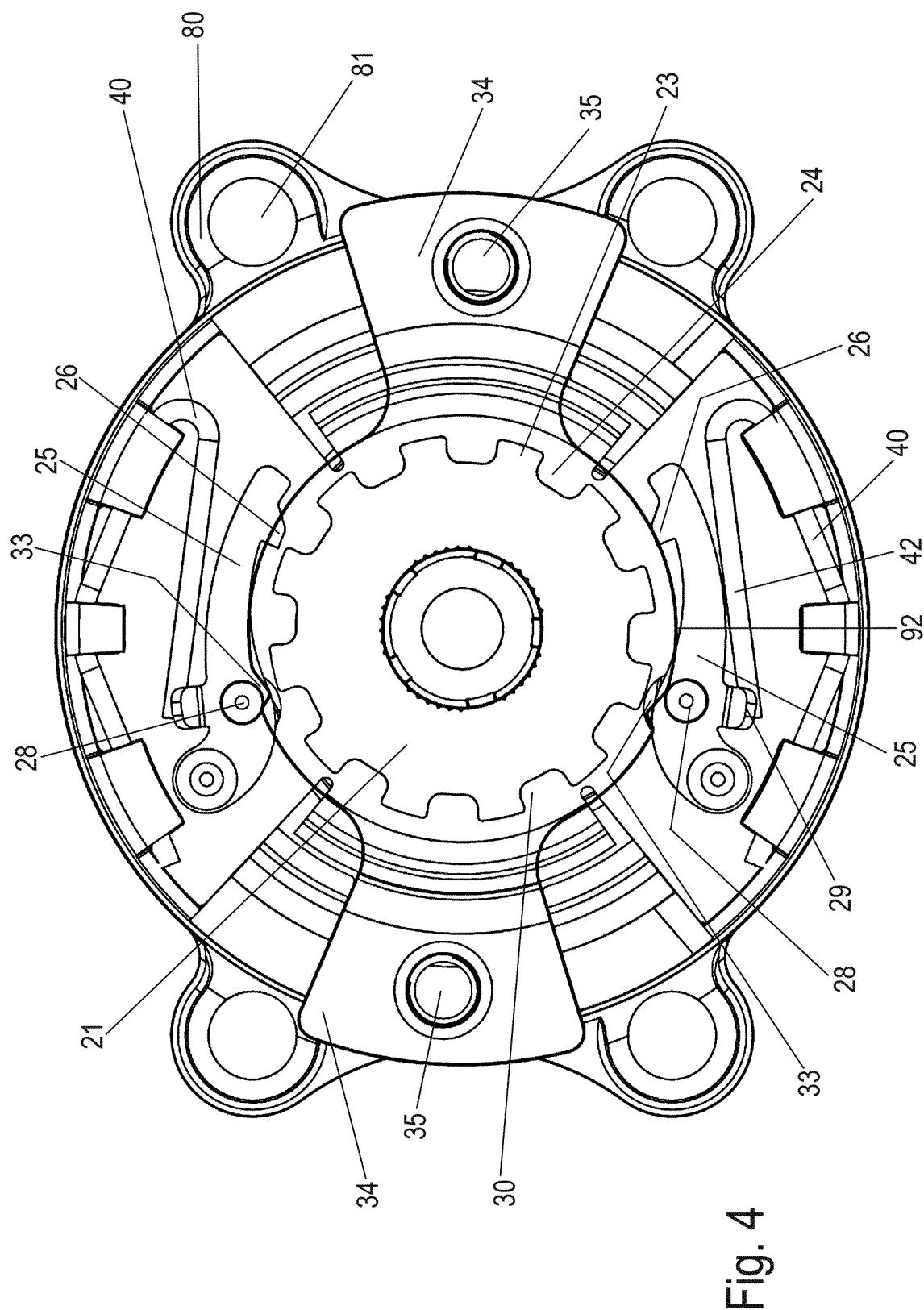
FIG. 4 shows a view of the adjustment device in FIG. 2 in an unlocked position.

In the locked position, the seat body 2 cannot be adjusted in height. However, if the lever 7 is pivoted for an adjusting operation, the additional locking means 20 is to be unlocked, as shown in FIG. 4.

By the rotational movement of the lever 7, the control disk 30 is rotated so that the locking recesses 33 are moved on the circumference 32 of the control disk 30, as a result of which both actuating sections 28 of the two locking levers 25 are moved radially outwardly, as a result of which both ratchet pawls 26 of the locking lever 25 come out of engagement from the locking disk 21. The distance of each actuating section 28 from the rotational axis 13 is less than 50% of the distance of the rotational axis 13 from the ratchet pawl 26, so that the ratchet pawls 26 are released from the locking disk 21 with a correspondingly larger movement. As a result of this transmission ratio, it is sufficient to rotate the lever 7 by a small angle, for example by less than 4°, in particular less than 3°, in order to unlock the ratchet pawls 26. After unlocking, the movement of the lever 7 can be used to release the sprag freewheels in order to adjust the seat body 2 in height, as is already explained in DE 10 2014 103 989.

The distance between the actuating section 28 and the ratchet pawl 26 is selected so that the lines to the ratchet pawl 26 on the one hand and the actuating section 28 on the other hand enclose an angle of at least 10° with respect to a longitudinal axis of the shaft 9 as a centre point, in particular an angle of between 20° and 45°. The distance of the ratchet pawl 26 from the actuating section 28 depends on the adjustment device and is, for example, at least 10 mm.

Figure 5:
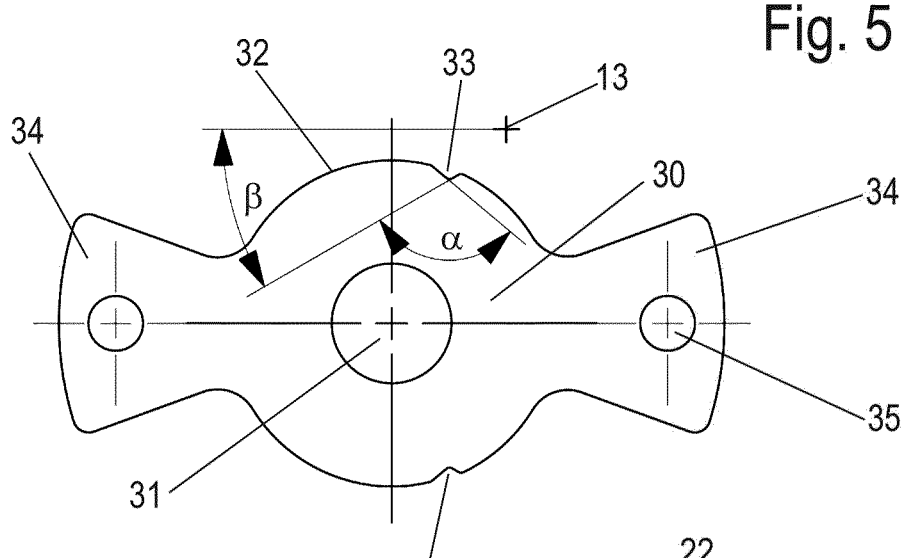
FIG. 5 shows a detailed view of the control disk of the adjustment device.

In FIG. 5, the control disk 30 is shown in detail. The control disk 30 comprises two locking recesses 33, which have a substantially V-shaped contour, wherein the two limbs of the "V" are aligned at an angle α to one another. The angle α can lie in a range between 60° and 120°, in particular 80° to 100°, in order to be able to carry out a secure release by a slight movement of the control disk 30, regardless of the direction in which the control disk 30 is rotated. The control disk 30 can preferably consist of metal in order to be able to transmit high forces.

Figure 6:
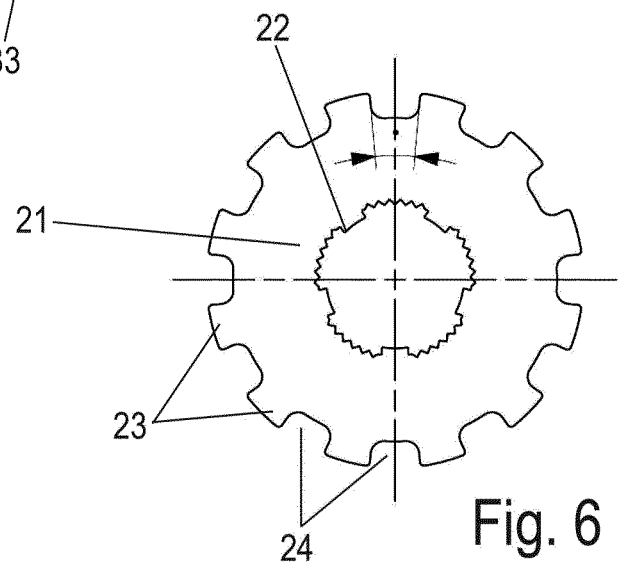
FIG. 6 shows a detailed view of the locking disk of the adjustment device.

In FIG. 6, the locking disk 21 of the additional locking means 20 is shown in detail. The locking disk 21, which is made of metal, has internal teeth 22, which ensure a rotationally fixed engagement with the shaft 9. At the outer circumference, the locking disk 21 comprises a plurality of substantially rectangular teeth 23 between which gaps 24 are formed. The lateral tooth flanks can be designed so as to be slightly inclined towards the radial, so that a corresponding self-locking effect is provided when the contact surface is correspondingly aligned with the ratchet pawl 26, i.e. the respective ratchet pawl 26 is pretensioned radially inwardly when a torque is applied to the locking disk 21.

Figure 7:
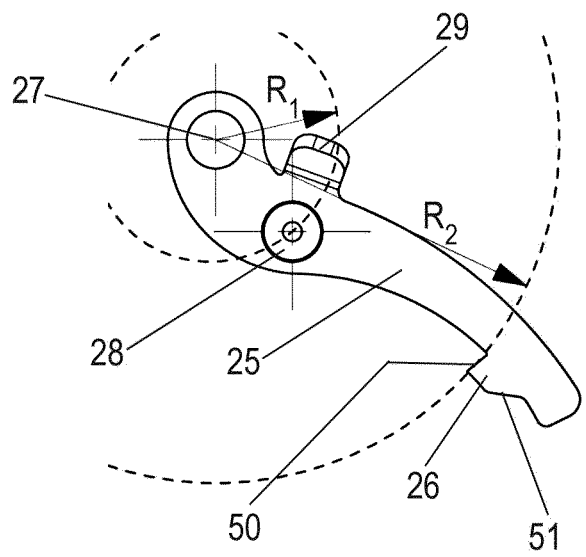
FIG. 7 shows a detailed view of a locking lever of the adjustment device of FIG. 2.

In FIG. 7, a locking lever 25 of the additional locking means 20 is shown in detail. The locking lever 25 is rotatably mounted about the axis on the opening 27, wherein the actuating section 28 is designed, for example, as a bolt or actuating element and is arranged at a distance $R_1$ from the rotational axis. A contact surface 50 of the ratchet pawl 26 is arranged at a distance $R_2$ from the rotational axis. $R_2$ is greater than $R_1$, in particular more than 50%, preferably by more than 100%. On the side opposite the contact surface 50, the ratchet pawl 26 has a guide bevel 51 so that no blocking action of this locking lever 25 is provided in the opposite direction. Both locking levers 25 therefore act only in one direction.

In the exemplary embodiment shown, two locking levers 25 are provided which are rotatably mounted about spaced-apart rotational axes 13, so that a compact design is possible. It is also possible to have more than two locking levers 25 for the additional locking means 20. In addition, the shape of the locking levers 25 can also be selected differently, i.e. these may be V-shaped, for example.

LIST OF REFERENCE NUMERALS

1 Seat
2 Seat body
3 Backrest
4 Frame
5 Lever
6 Adjustment device
7 Drive lever
8 Housing
9 Shaft
10 Output element
11 Drive element
12 Opening
13 Axis
20 Additional locking means
21 Locking disk
22 Projection
23 Tooth
24 Gap
25 Locking lever
26 Ratchet pawl
27 Opening
28 Actuating section
30 Control disk
31 Opening
32 Outer circumference
33 Locking recess
34 Extension arm
35 Opening
40 Spring
41 Limb
42 Spring limb
50 Contact surface
51 Guide bevel
80 Web
81 Opening
82 Cover
83 Retaining projection
90 Contour

What is claimed is:

1. An adjustment device (6), in particular for adjusting motor vehicle seats, comprising:
  a) a rotatably mounted drive element (11);
  b) a rotatably mounted output element (10);
  c) a first sprag freewheel, by means of which the output element (10) can be blocked in a stepless manner in different positions in both directions of adjustment and can be released via a release element;
  d) a second sprag freewheel, which is coupled to the first sprag freewheel via the release element, and by means of which the output element (10) can be adjusted in a stepless manner into different positions in both directions of adjustment;

e) an actuating element for releasing the second sprag freewheel, and f) an additional locking means (20) for securing the first sprag freewheel against a rotation with at least one locking lever (25) which is rotatably mounted about a rotational axis (27), wherein the rotatable locking lever (25) of the additional locking means (20) has an actuating section (28) for unlocking, which is arranged offset relative to a ratchet pawl (26) of the locking lever (25) in the circumferential direction of a locking element (21).

2. The adjustment device according to claim 1, wherein the offset of the actuating section (28) to the ratchet pawl (26) extends in the circumferential direction over an angle of at least 10°.

3. The adjustment device according to claim 1, wherein a distance of the actuating section (28) from the rotational axis (27) is less than half as great as the distance of the ratchet pawl (26) from the rotational axis (27).

4. The adjustment device according to claim 1, wherein the additional locking means (20) can be unlocked with the ratchet pawl (50) during a rotary movement of the drive element (11) of less than 4°.

5. The adjustment device according to claim 1, wherein the at least one locking lever (25) with the ratchet pawl (26) is biased into engagement with the locking element.

6. The adjustment device according to claim 1, wherein the actuating section (28) is configured to be moved by a control disk (30).

7. The adjustment device according to claim 6, wherein a locking recess (33) is provided on the control disk (30), into which the actuating section (28) engages in a starting position, and the control disk (30) is coupled to the actuating element (7).

8. The adjustment device according to claim 1, wherein the additional locking means (20) has two locking levers (25), which are rotatably mounted around different rotational axes (27).

9. The adjustment device according to claim 1, wherein the ratchet pawl (26) is configured to be brought into engagement with teeth (23) of the locking element (21).

10. The adjustment device according to claim 9, wherein the ratchet pawl (26) has a contact surface (50) which is oriented in an inclined manner to a radial direction of the rotational axis of the locking element (21), in particular at an angle between 2° to 15°.

11. The adjustment device according to claim 1, wherein the teeth (23) of the locking element (21) are substantially rectangular in shape, wherein flanks of the teeth is inclined inwardly between 0° and 10°.

* * * * *